FIG. 1
FIG. 2
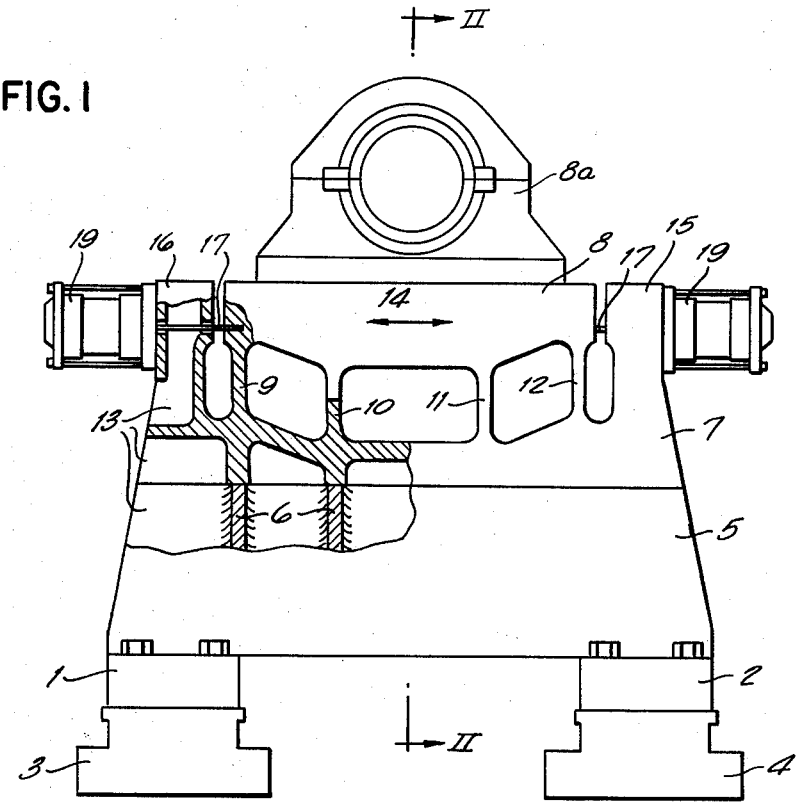
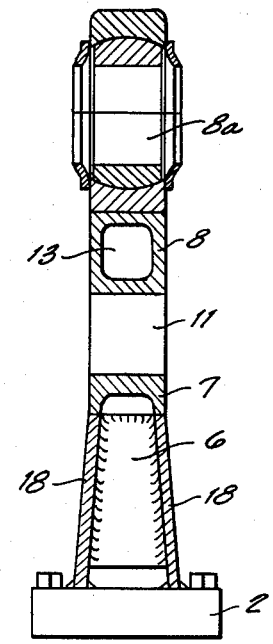

May 11, 1965  K. FEDERN ETAL  3,182,511
VIBRATORY TESTING MACHINE, PARTICULARLY BALANCING MACHINE
Filed Oct. 12, 1962  3 Sheets-Sheet 2
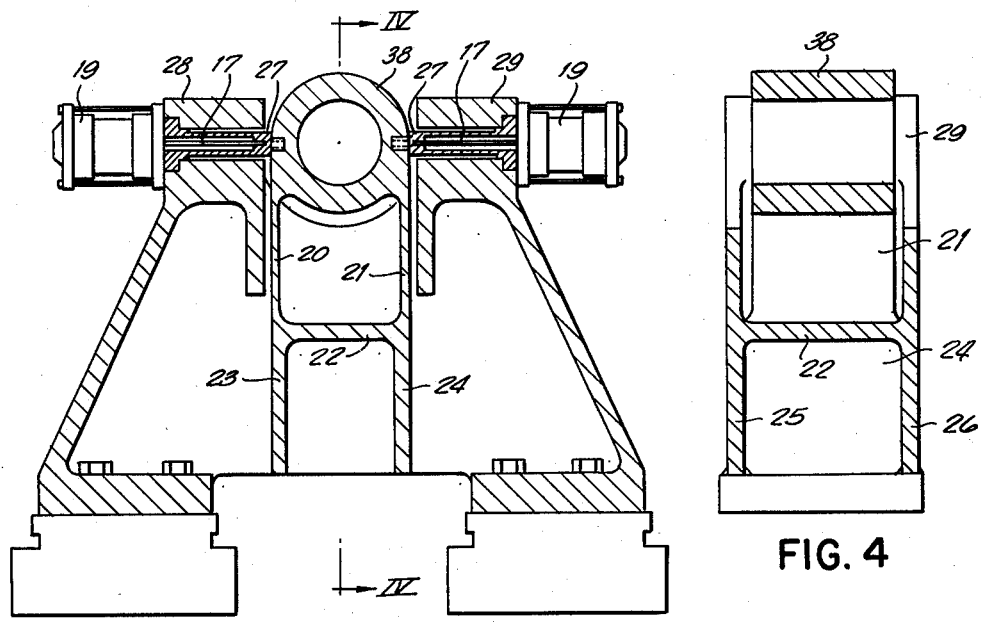
FIG. 3
FIG. 4
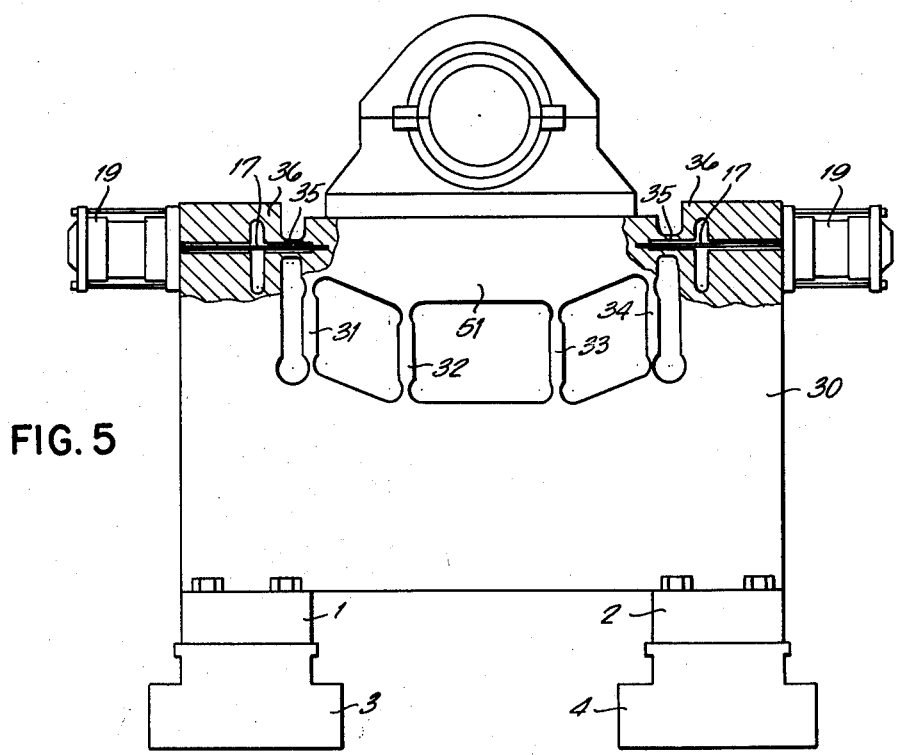
FIG. 5

United States Patent Office 3,182,511
Patented May 11, 1965

3,182,511
VIBRATORY TESTING MACHINE, PARTICULARLY BALANCING MACHINE
Klaus Federn, Darmstadt, Heinrich Geiss, Darmstadt-Eberstadt, and Alfred Seibert, Darmstadt, Germany, assignors to Carl Schenck Maschinenfabrik G.m.b.H., Darmstadt, Germany, a corporation of Germany
Filed Oct. 12, 1962, Ser. No. 231,318
Claims priority, application Germany, Oct. 13, 1961, Sch. 30,412
10 Claims. (Cl. 73—477)

Our invention relates to vibratory testing machines in general, and in a preferred aspect to machines for balance-testing of rotating workpieces.

Machines of this type comprise a rigidly fixed base structure on which a workpiece-holding or journalling structure is mounted by elastically yieldable supporting means that permit the workpiece holding structure to perform vibratory motion in the direction of the oscillatory measurement to be performed. In machines for determining the unbalance of rotating workpieces, the workpiece is rotatably accommodated on a vibratory table structure or bearing bridge which possesses a greater or lesser but always ascertainable yieldability in the measuring direction and which is supported and braced against the machine base structure perpendicularly to the measuring direction by means of leaf springs, round rod springs or the like supporting members. In cases where a high stiffness of yield in the measuring direction is desired, the bearing bridge or other workpiece-holding structure is additionally braced against the fixed base structure by means of additional supporting members extending in the measuring direction between the supporting structure and the base structure. The latter supporting members may be equipped with transducers or sensors for directly or indirectly measuring the vibratory deflections or forces, such as wire strain gauges, force-measuring capsules, piezoelectric transducers, or the like.

In modern machinery some of the rotating components are already called upon to operate at extremely high speeds and the tendency is toward still greater rotating speeds. Since the vibratory frequencies to be investigated are directly proportional to the rotary speeds, an insufficient stiffness of the workpiece-holding structures transverse to the measuring direction becomes increasingly detrimental to the desired accuracy of the measuring results. This cannot be obviated by giving the supporting members greater stiffness in their longitudinal direction, because the stiffness transverse to that longitudinal direction and transverse to the vibration-measuring direction remains too low. That is, when testing rotating bodies for unbalance, the just-mentioned expedients would not eliminate the lack of sufficient stiffness in the axial direction of the workpiece being tested so that undesired resonances in the range of the speeds of rotation necessary for proper balancing may occur in the direction transverse to the workpiece-journalling structure, namely in the axial direction of the workpiece. Such resonance stresses the support in the bending sense, or, in cases where the supporting means are composed of individual wires or round rods inclined toward each other, imposes very high tension-compression forces thereupon. Some improvement in this respect has been attained by employing broad leaf springs and fastening them with the aid of notch-and-tooth engagements to the workpiece-holding structure and to the fixed base structure of the machine. This, however, fails to sufficiently eliminate the inevitable yielding tendency in the clamped or bolted connections at the respective ends of the leaf springs so that the applicability of such devices has been limited, aside from the fact that such clamping or screw-bolt connections result in excessively expensive constructions.

It is an object of our invention to devise a vibratory testing machine which more reliably avoids the above-mentioned undesired yieldability in directions transverse to the vibratorily mounted workpiece-holding or journalling structure and which avoids the limitation and complication inherent in the provision of the above- mentioned clamping or bolt connections within such a machine.

To this end, and in accordance with a feature of our invention, the vibratory workpiece-holding structure, having means for accommodating a workpiece and defining a given measuring direction, is integrally joined with the fixed base structure, as well as with the intermediate supporting means that join the workpiece-holding structure and the base structure together and comprise a plurality of supporting rod members in form of a parallelogram guide or linkage mechanism yieldable in the measuring direction and stiff in planes transverse thereto. Thus, the workpiece-holding structure, the above-mentioned supporting means and the base structure of the machine form jointly a single continuous piece or gapless entity.

Such a machine unit, comprising the vibratory holding structure as well as the supporting means and the base structure as a single unit, can be produced by chip-removing machining from a single original piece of steel, and/or it may consist substantially of a single casting, and/or it may be produced from components by permanently welding them together. Suitable welding methods for such purposes are substantially all known welding processes, for example, butt-welding, electronic welding, arc-welding, gas-welding, or the like. In some cases it is preferable to employ a combination of the above-mentioned manufacturing methods.

According to another feature of our invention relating to cases where it is desirable to have an increased yielding stiffness in the measuring direction, the above-described machine is provided with an additional supporting member that extends in the measuring direction to brace the vibratory workpiece-holding structure against the base structure of the machine and is likewise joined integrally and hence without gap, at one end with the vibratory holding structure and at the other end with the base. In cases where the additional supporting member in the measuring direction does not possess sufficient elasticity for the purpose of force measurement in that direction, it is preferably joined with another member that is sufficiently and bendingly elastic in the measuring direction and is joined with the base structure to form an integral and gapless piece therewith.

The above-mentioned and more specific objects, advantages and features of our invention, said features being set forth with particularity in the claims annexed hereto, will be apparent from, and will be described in, the following with reference to four embodiments of balance testing machines according to the invention illustrated by way of example on the accompanying drawings in which:

FIG. 1 is a part-sectional front view of a first machine, and FIG. 2 is a cross section along the line II—II in FIG. 1.

FIG. 3 shows a transverse sectional view of a second machine, and FIG. 4 is a cross section along the line IV—IV in FIG. 3.

FIG. 5 is a part-sectional front view of a third machine.

Figure 6:
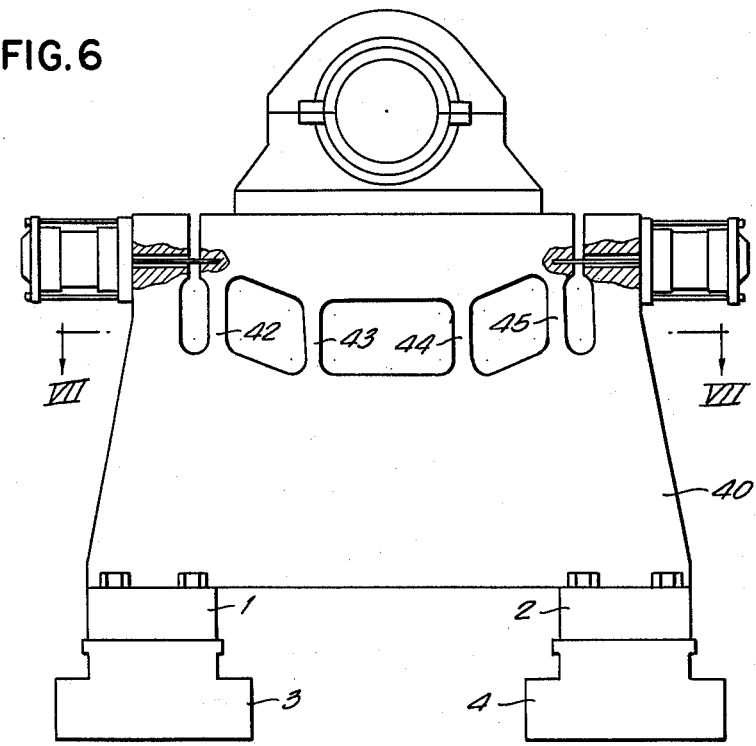
FIG. 6 is a part-sectional front view of a fourth machine, and FIG. 7 a horizontal section taken along the line VII—VII in FIG. 6.

In the machine according to FIGS. 1 and 2, the upper portion 7, comprising the entire workpiece-journalling structure 8 as well as the leaf-spring-type supporting members 9 to 14, consists of a single-piece steel casting and is permanently welded together with the lower portion 5 of the machine.

The base structure of the machine, comprising the entire lower portion 5 and part of the casting that constitutes the upper portion 7, is provided with feet 1 and 2 whose broad base areas are seated on respective foundations 3, 4 with which the feet are firmly bolted together. The feet of the machine base must be given a wide and large-area design so that no yielding at the foundation can occur as might obviate the advantages afforded by the invention.

The lower portion 5 of the machine structure consists of a welded assembly of individual parts which, aside from the feet 1 and 2, comprise lateral wall members 18 joined with each other by welded transverse webs 6. Hollow spaces 13 in the casting that forms the upper portion 7 of the machine serve to reduce its vibratory mass.

The journalling structure 8 carries a bearing 8a for rotatably accommodating the shaft of a rotor to be tested for unbalance. While a glide bearing is shown, another type of bearing, such as a roller bearing, may be used. The supporting rods 9 to 12 have a given resilient stiffness in the measuring direction indicated by a double-headed arrow 14, this direction being in a radial plane with respect to the axis of workpiece rotation determined by the axis of the bearing 8a. The stiffness is such that no additional supporting or bracing members are needed in the measuring direction between the vibratory journalling structure 8 and the upwardly extended lateral portions 15 and 16 of the fixed structure of the machine. Fastened to the lateral portions 15 and 16 of the fixed structure are respective transducers 19 here shown to consist of conventional electrodynamic vibration pickups which furnish respective output voltages proportional to the vibratory motion of a sensing rod 17 that extends from each transducer toward the journalling structure 8 and is firmly joined therewith. The measuring or sensing direction is thus defined by the common axis of the sensing rods 17 and 19.

The machine is preferably given such a design that the junction surface between the bearing 8a and the top of the workpiece-holding structure 8 is as close as feasible to the measuring axis which, as explained, is determined by the common axis of the sensing feelers 17 in the embodiment of FIGS. 1 and 2. The closer the junction is to the measuring axis, the more negligible is the stiffness of this junction with respect to the stiffness of the elastic supporting members in the transverse direction so that the degree of stiffness of the connection between the bearing and the vibratory holding structure, as a rule, becomes negligible.

For particularly exacting requirements, it is of advantage to fully avoid such a junction between workpiece-bearing and vibratory holding structure as well as the occurrence of any bending forces that may be imposed upon the connection. This can be done by having the holding structure 38 according to FIGS. 3 and 4 so designed that it forms a bearing space around the center axis of the bearing.

In the embodiment of FIGS. 3 and 4, the center axis of the bearing intersects the measuring axis defined by the common axis of the two sensing rods 17 located on opposite sides respectively of the vibratorily supported holding structure 38. In this embodiment, the supporting rods 20 and 21 are welded to the structure 38. The supporting members 20 and 21 are welded to a transverse web 22. The transverse web 22 and respective extensions 23 and 24 of supporting members 20 and 21 are joined by welding with the front and rear walls 25 and 26 of the base structure. This machine is provided with additional supporting members 27 located on opposite sides of the bearing bridge 38 and extending in the measuring direction. Each of the supporting members 27 is in a tight threaded engagement with the vibratory journalling structure 38 and with a lateral portion 28 or 29 of the fixed structure. Two transducers 19 are joined by a threaded connection with the lateral portions 28 and 29 respectively and have respective sensing rods 17 joined rigidly with the journalling structure 38. The lateral rigid junction is effected by virtue of the fact that the sensing ends of the rods 17 are rigidly joined with a solid end portion of the adjacent bracing member 27 close to the point where the member 27 is screwed together with the structure 38, the member 27 having tubular shape and extending in coaxial relation to the sensing rod 17.

In the embodiment shown in FIG. 5, the journalling structure 51 as well as the supporting rods 31 to 34 and the base structure 30 of the machine are machined from a single piece of steel. In this embodiment the desired yielding stiffness in the measuring direction is secured not only by corresponding dimensioning of the supporting rods 31 to 34, but also by additional supporting or bracing members 35 extending in the measuring direction. As exemplified by this embodiment, if the stiffness of the bracing members in the measuring direction is too large, these members are made to abut against portions 36 of the structure that are bendingly elastic in the measuring direction.

The stiffness of the supporting members 31 to 36 is so dimensioned that the transducers 19 furnish a signal indicative of the share of unbalance imposed by the rotating workpiece upon the vibratory journalling structure. To this end, the transducers 19 are connected with the journalling structure 51 by respective sensing rods 17 as described in conjunction with the preceding embodiments.

Figure 7:
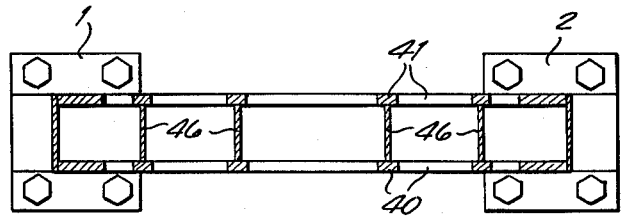

In the embodiment illustrated in FIGS. 6 and 7, the machine structure is substantially constituted by sheet-metal members 40 and 41 located on the front and rear side. In the range of the supporting rods 42 to 45, the sheet-metal structure is braced by reenforcing webs 46 extending in the transverse direction in order to impart to the entire structure a high rigidity in directions parallel to the axis or workpiece rotation. It is further of advantage to also provide such transverse reenforcing webs in the lower portion of the base structure. All of the reenforcing webs are welded together with the two sheet-metal structures 40 and 41. In the illustrated embodiment, the desired stiffness of yield in the measuring direction is secured by the supporting rods 42 to 45. However, if desired, additional supporting or bracing members in the measuring direction may also be provided in embodiments of the type according to FIGS. 6 and 7, and if further necessary, such additional bracing members may be joined with bendingly elastic spring members or portions according to those shown at 35 and 36 in FIG. 5.

To those skilled in the art, it will be obvious, upon a study of this disclosure and with respect to design details and arrangement, that our invention can be given a variety of modifications and hence can be embodied in machines other than particularly illustrated and described herein, without departing from the essential features of our invention and within the scope of the claims annexed hereto.

We claim:

1. A vibratory testing machine, comprising a rigidly fixed base structure, a vibratory workpiece-holding structure having means for accommodating a workpiece and defining a given measuring direction, supporting means joining said structures and comprising a plurality of supporting rod members forming a parallelogram linkage yieldable in said measuring direction and stiff in planes transverse to said direction to limit vibration of said holding structure to said measuring direction, said vibratory holding structure and said base structure as well as said supporting means forming jointly a single integral and gaplessly continuous piece.

2. A vibratory testing machine for balance testing of rotating workpieces, comprising a rigid fixed base structure, a vibratory workpiece journalling structure having bearing means for rotatably accommodating a workpiece and defining an axis of workpiece rotation and a measuring direction in a radial plane of said axis, supporting means joining said two structures and comprising a plurality of supporting rod members forming a parallelogram linkage yieldable in said measuring direction and stiff in the direction of said axis of rotation to limit vibration of said journalling structure to said measuring direction, said vibratory journalling structure and said base structure as well as said supporting means forming jointly a single integral and gaplessly continuous piece.

3. A vibratory testing machine according to claim 2, comprising bracing members of predetermined elastic stiffness extending in said measuring direction between said journalling structure and said base structure and being firmly joined with both said structures.

4. A vibratory testing machine according to claim 2, comprising bracing members of predetermined elastic stiffness extending on opposite sides respectively of said journalling structure in said measuring direction, each of said members being threadedly joined at one end with said journalling structure and gaplessly at the other end with said base structure to form part of said integral piece.

5. In a vibratory testing machine according to claim 2, said single piece consisting substantially of a machined block of one and the same material.

6. In a vibratory testing machine according to claim 2, said single piece consisting substantially of a casting.

7. In a vibratory testing machine according to claim 2, said single piece consisting of welded components.

8. A vibratory testing machine for balance testing of rotating workpieces, comprising a rigid and fixed base structure having two upwardly protruding lateral portions, a vibratory workpiece journalling structure having bearing means for rotatably accommodating a workpiece and defining an axis of workpiece rotation and a measuring direction in a radial plane of said axis, said measuring direction being parallel to the direction of spacing between said lateral portions of said base structure, said journalling structure being located between said two lateral portions of said fixed base structure and being spaced from said two portions in said measuring direction, supporting means joining said two structures and comprising a plurality of supporting rod members forming a parallelogram linkage yieldable in said measuring direction and stiff in directions parallel to said axis of rotation to limit vibration of said journalling structure to said measuring direction, said vibratory journalling structure and said base structure as well as said supporting means forming jointly a single integral and gaplessly continuous piece.

9. A vibratory testing machine according to claim 8, comprising vibration transducer means mounted on one of said lateral portions of said base structure and having a vibration sensing member engaging said journalling structure.

10. In a vibratory testing machine according to claim 8, said axis of rotation and said measuring direction being located substantially in a single geometric plane.

References Cited by the Examiner

UNITED STATES PATENTS

| | | | |
|---|---|---|---|
| 2,329,654 | 9/43 | Rouy | 73—475 |
| 2,461,645 | 2/49 | Kallmann | 73—473 |
| 2,815,666 | 12/57 | Pischel | 73—477 |
| 2,851,885 | 9/58 | Federn | 73—463 |

FOREIGN PATENTS 1,242,717　8/60　France.

RICHARD C. QUEISSER, *Primary Examiner.*

JOSEPH P. STRIZAK, *Examiner.*